Feb. 21, 1967 R. B. AITCHISON 3,305,350
PROCESS AND APPARATUS FOR MAKING STEEL
Original Filed May 18, 1961 4 Sheets-Sheet 1
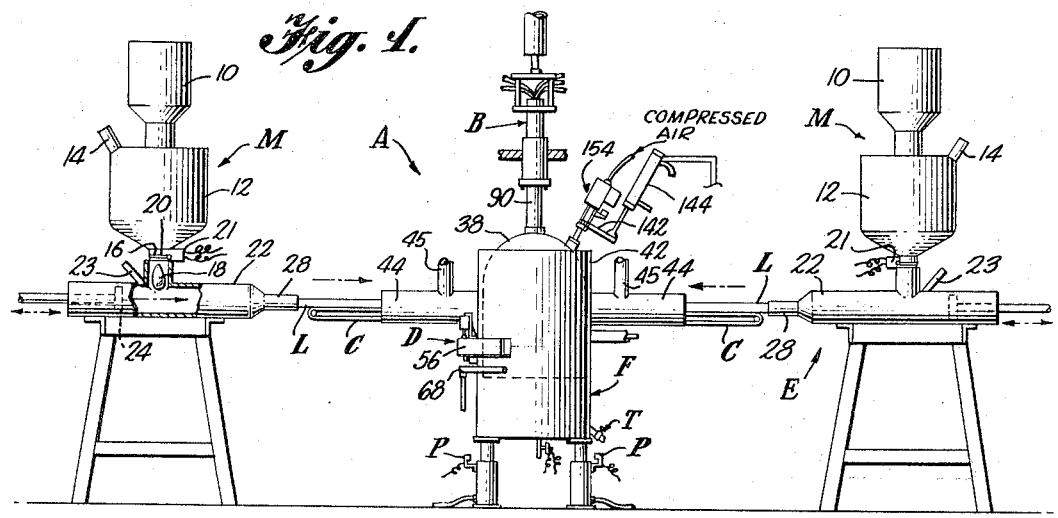
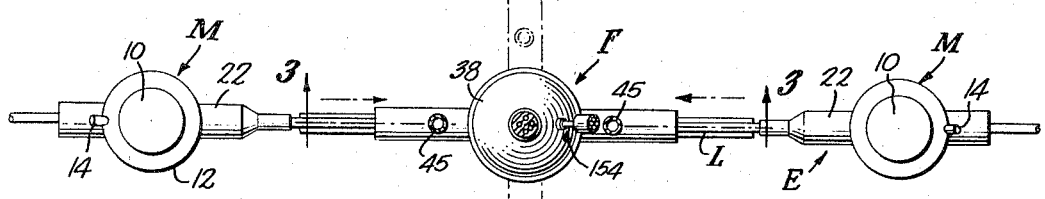
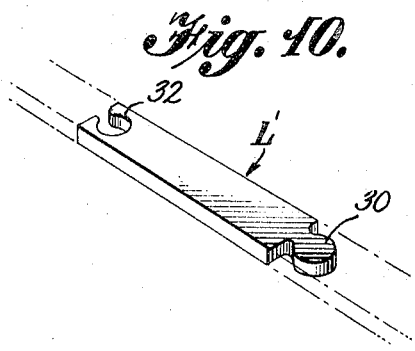
INVENTOR
Robert B. Aitchison
BY Mason, Fenwick & Lawrence
ATTORNEYS

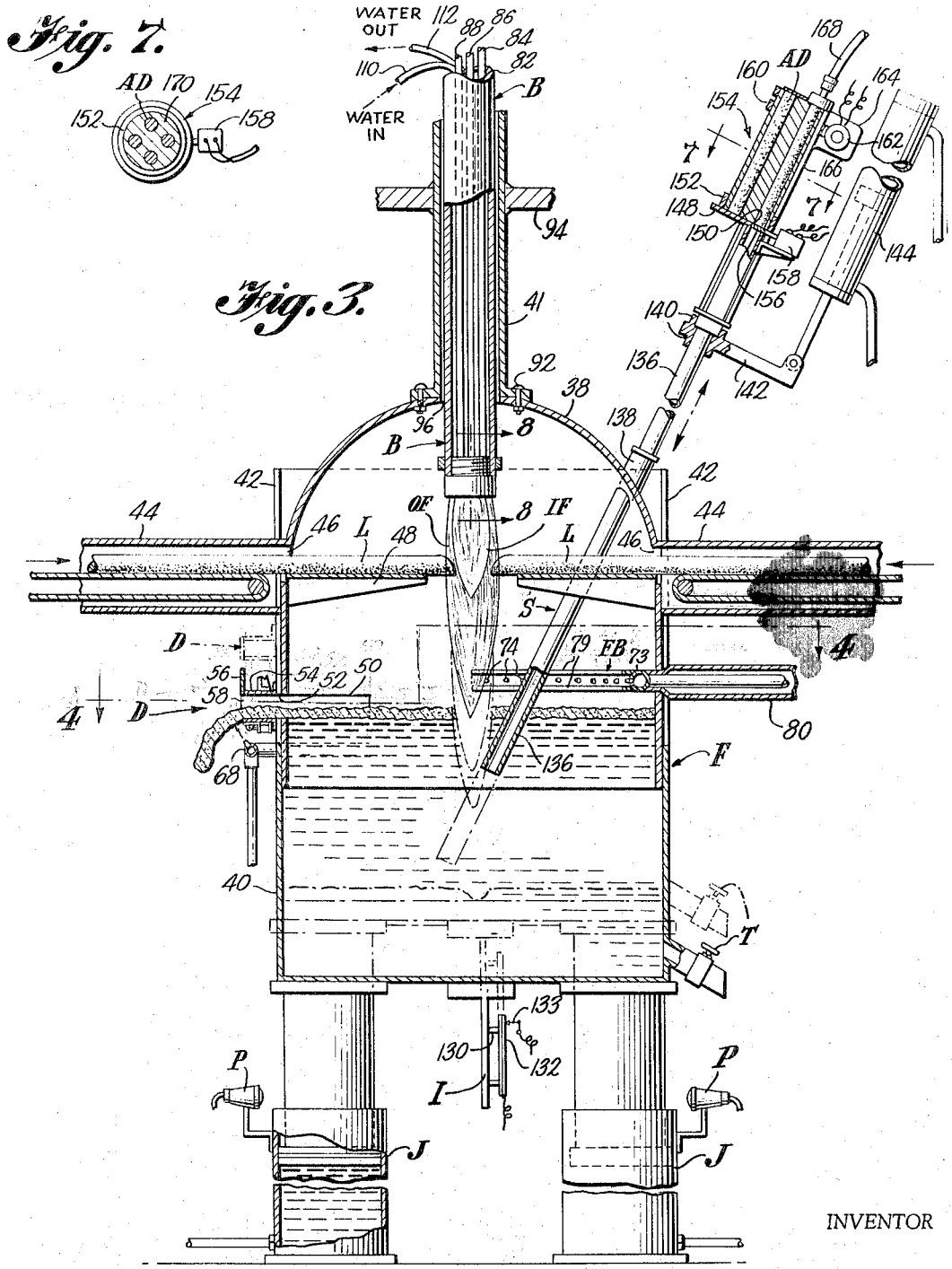

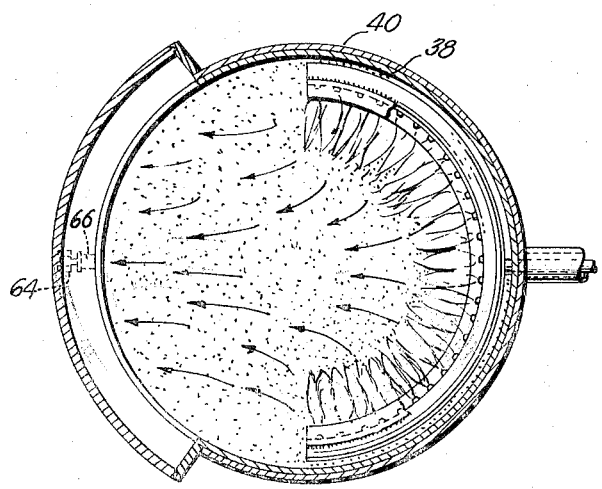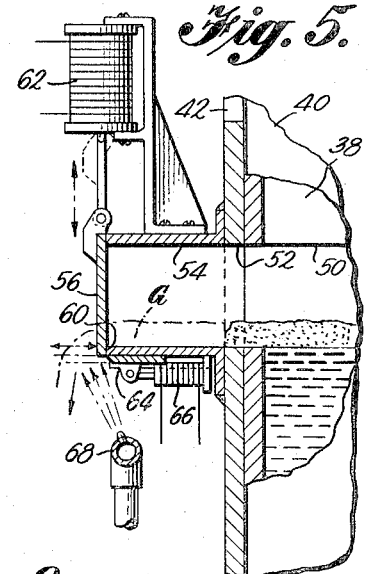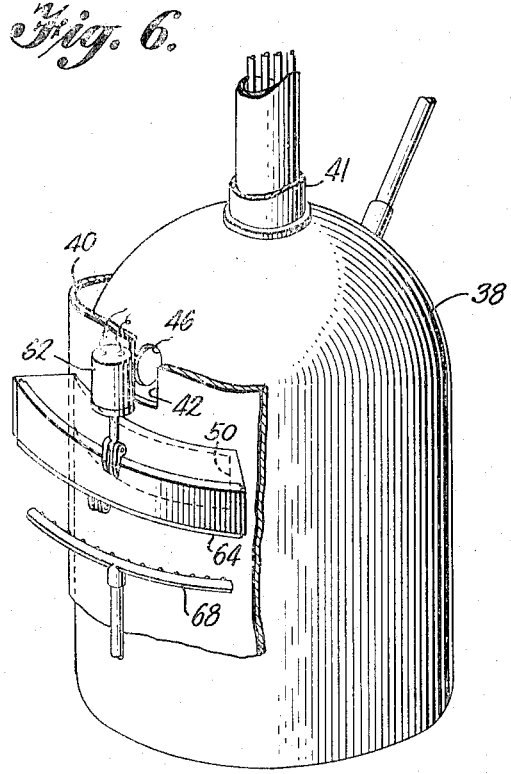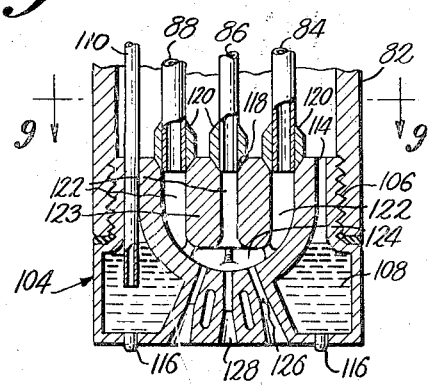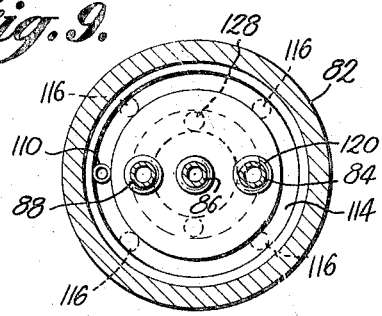

INVENTOR
Robert B. Aitchison
BY Mason, Fenwick & Lawrence
ATTORNEYS

United States Patent Office 3,305,350
Patented Feb. 21, 1967

3,305,350
PROCESS AND APPARATUS FOR MAKING STEEL
Robert B. Aitchison, 2311 Lisenby Ave.,
Panama City, Fla. 32401
Original application May 18, 1961, Ser. No. 111,044.
Divided and this application Jan. 14, 1965, Ser. No. 426,710
18 Claims. (Cl. 75—40)

This is a divisional application of Serial No. 111,044, filed May 18, 1961, now abandoned.

This invention relates generally to an apparatus and a process for the direct reduction of iron ore into steel. More particularly, the present invention relates to an apparatus and a process for directly producing steel from a unique iron ore product.

Direct reduction processes for the production of steel from iron ore without utilizing the usual blast furnace have been proposed and experimented with in the past. However, for a variety of reasons, none have reached the success status predicted or expected of them. For example, one well publicized process requires a high quality ore that has a controlled amount of manganese and silica. Present domestic ore deposits, therefore, having high manganese and silica contents proved to be unsatisfactory, necessitating the use of economically unfeasible raw material.

Although previously unsuccessful, a direct iron ore reduction process is becoming more and more the logical approach to the manufacture of steel, particularly in the United States. This is true primarily due to the fact that the easily accessible high quality U.S. ores are being rapidly depleted. For instance, it is noteworthy that the best of the economically extractible ore is rated at approximately only 51% natural iron oxide. Therefore, beneficiation of this low grade iron ore is necessary in order to maintain a relatively high percentage of iron in the raw material used for steel making. In general, the beneficiated ore produced contains at least 62% iron oxide, and generally 62 to 65% iron oxide. Thus, with a raw material having such a high percentage of iron oxide, there is a greater possibility of reducing the oxide directly, without being overburdened with an excess amount of inerts. In addition, by such beneficiation, a great many low grade ore deposits previously uneconomical, could provide a source of domestic raw material for many years to come.

Before labeling any direct reduction process successful, it must meet and overcome many difficulties which have often produced failures in the past. Among these difficulties is the fact that much of the domestic ore produces a high silica content in the concentrated or beneficiated ore. Usually, the concentrate will average about 7–9% silica content, which is entirely satisfactory for conventional steel mill practice, but not for many of the prior known direct reduction processes.

Another and one of the most important aspects of any radically different process is one of economics of installation, maintenance and land area requirements. With regard to the latter, it is obviously advantageous to use the least land possible for steel operations. However, most of the prior processes for steel making were not conservative in the use of land, and generally spread over vast areas.

Consequently, it is the principal and general object of this invention to provide a process, product and apparatus which permit the direct reduction into steel of iron ore, which may be in the form of a concentrate, without the use of the conventional blast furnace.

It is also the object of the present invention to provide a unique apparatus, fully automatic, which can convert an iron ore directly into steel.

Another object of the present invention is the provision of an iron ore concentrate product and the process for making it which facilitates the feeding of the ore whereby the ore may be easily melted.

Another object of this invention is to provide a novel burner structure which has great flexibility, and which possesses the capability of quickly melting the ore while helping to protect the melt from contamination.

Another object of this invention is the provision of a flame brush and a slag doorway for effectively removing the slag from the top of the melt without undesirable cooling of the melt.

Another object of this invention is to provide a novel means for discharging slag producing material and/or metaloids into the melt to a location which produces the desirable type and amount of slag and steel.

Another object of this invention is the provision of means for raising and lowering the burner structure according to the height of the melt in the apparatus, whereby the contamination of the melt is minimized.

Another object of the present invention is to control the operation of the apparatus to produce a predetermined sequence operation within the apparatus.

A further object of this invention is the provision of means operable by the melt quantity to initiate the predetermined sequential operation.

It is a still further object of this invention to provide a process and apparatus which uses a relatively small amount of ground area, and which is more economical to install than the conventional blast furnace and open hearth furnace of steel production.

Other objects and advantages of the present invention will become apparent to those skilled in the art, from the following description when read in conjunction with the accompanying drawing, wherein:

FIGURE 1 is a side elevational view showing the complete apparatus, including the furnace and the feeding mechanisms;

FIGURE 2 is a plan view of the apparatus comprising the present invention, and includes in phantom, additional feeding mechanisms other than those shown in solid line;

FIGURE 3 is a cross-sectional elevational view along lines 3—3, showing the details of the furnace conveyor mechanism, burner, snorkel structure, and operation initiation means;

FIGURE 4 is a cross-sectional view taken along lines 4—4 of FIGURE 3, showing the operation of the flame brush and the slag door;

FIGURE 5 is a cross-sectional view in elevation, of the slag door and the operating mechanism associated therewith, along with the scraper blade and water quench means;

FIGURE 6 is a perspective view of the dome portion of the furnace, showing the slag door opening, the feeder opening, the burner, and the snorkel means;

FIGURE 7 is a cross-sectional view taken along lines 7—7 of FIGURE 3, showing the revolver type cartridge means associated with the snorkel;

FIGURE 8 is a cross-sectional view in elevation of the burner, as seen along lines 8—8 of FIGURE 3;

FIGURE 9 is a cross-sectional view taken along lines 9—9 of FIGURE 8, showing the pattern and arrangement of the outlet and feeding conduits;

FIGURE 10 is a perspective view of a loglet according to one of the embodiments of the present invention;

FIGURE 10a is a cross-sectional view taken along lines A—A of FIGURE 10, showing a center matrix within a surrounding matrix of iron ore;

FIGURE 10b is a view taken along lines B—B of FIGURE 10a;

Figure 11:
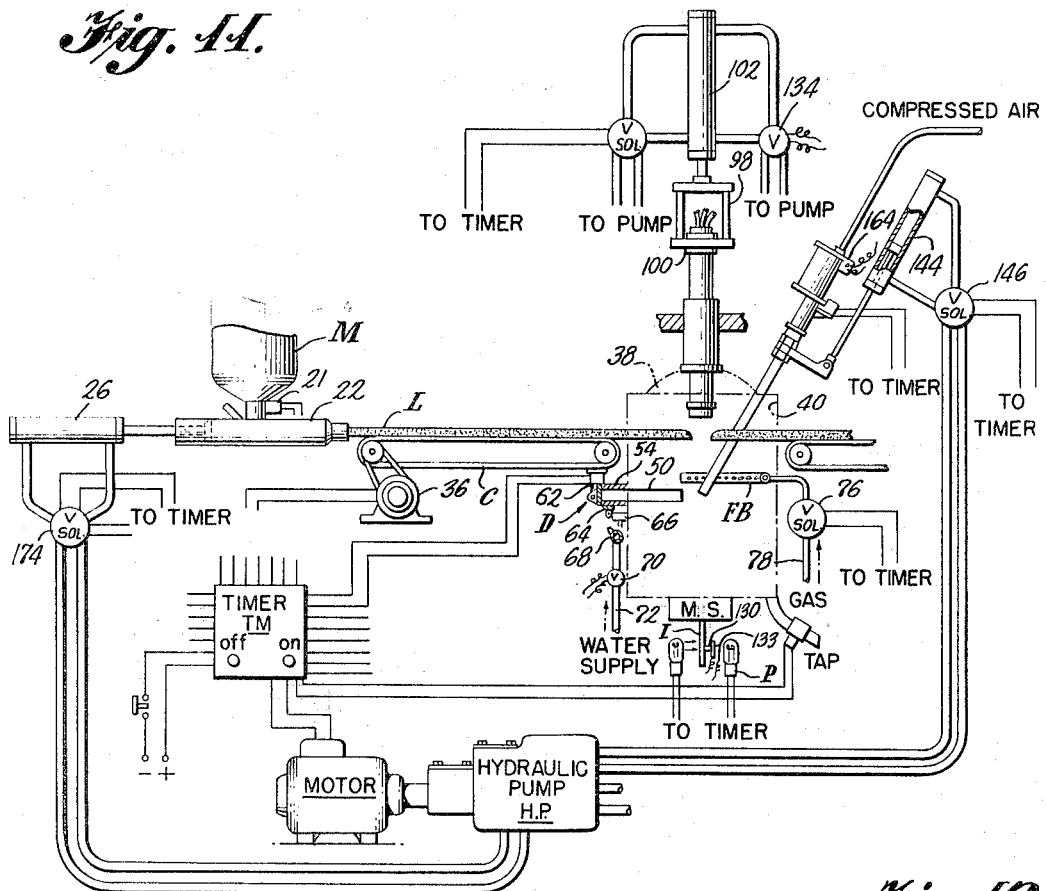
FIGURE 11 is a schematic view of the operating mechanism which maintains a predetermined sequence of the operation of the various elements and means within the present invention.

The present invention is designed primarily to provide a complete and novel apparatus for the direct reduction of iron ore to steel.

The general structure comprising the present invention is best graphically shown in FIGURE 1, wherein the general functioning units are clearly depicted in relation to each other. The letter A is used to designate apparatus. M generally designates the mixing units used to combine and mix the ingredients that form the gob, as best shown in FIGURE 1, which is ultimately formed into the log L. E designates the extruder which receives the gob, and extrudes the composition making up the gob into the continuous log L. This log is shown moving forward towards the furnace F, by means of the conveyor system C, which projects the log into the furnace F, in order that the flame from the burner B will melt the log. Burner B will also operate to protect the melt from contamination. Also, at a predetermined time, the snorkel S will operate to inject into melt within the furnace, the necessary materials to produce the type of steel desired. However, before the snorkel S operates, the slag door D will open and the flame brush FB will force the slag on top of the melt out the slag door D. The molten steel is then removed from the tap T. The elements of the apparatus are closely controlled to a set sequence of operation, by means including weight responsive jacks J, operatively associated with interference plate I, designed to interrupt the electronic photo circuit P, to set in motion the sequential process.

The novel log L is composed primarily of an iron ore, which may be hematite ($Fe_2O_3$) or magnetite ($Fe_3O_4$). In view of the fact that the known high grade ore sources in this country have for the most part been depleted, it has been a general practice to concentrate the easily extracted American ores rated at approximately 51% iron oxide to a concentration that usually averages between 62 to 65% iron oxide. For the purposes of this invention, an iron ore concentrate not less than 63% is preferred. However, the concentrate may be as low in iron oxide as approximately 55%.

The concentrate particles generally should be of a mesh size in the range of 30 to 200 mesh. In the present process the concentrate may be made into a continuous log, either at the mine site, in which case shipment of the product might be in steel billets, or the concentrate could be processed at the steel mill. In the case of some ores which are mined in large particle size (30 mesh), it is not necessary to grind these ores as previously proposed. This is of particular advantage with Specular Hematite ores which have been found difficult and expensive to grind into the fine particle size.

The log, in addition to the iron ore concentrate, may contain powders preferably of discrete size of materials, such as carbon, lime, dolomite, ferro manganese and ferro silicon, which in general are all commonly used for the production of steel from blast furnace iron in the conventional open hearth furnace. Since these additives per se do not form a part of this invention, the uses and details concerning their purpose need not be set forth here. For the use and value of certain of these additives, reference may be had to the following reports of the U.S. Department of Interior, Bureau of Mines: RI 3419 (1939) and RI 3480 (1940). As an example, a simple composition for one of the logs, according to the present invention is as follows, all parts being by weight:

|  | Parts |
|---|---|
| $Fe_3O_4$ concentrate | 192 |
| Finely divided pulverized charcoal | 12 |
| Lime | 6 |
| Milk of magnesia, pulverized | 1 |
| Pulverized and sifted ferro manganese (90%) | 3 |

The additives, being well known in the art, and having a well known function, are well within the province of the skilled worker. It is, therefore, not necessary to go into the various other additives, nor the ranges of these materials to be used in the formation of a log, according to this invention.

The logs are formed from the iron ore concentrate by first adding the powdered concentration, in addition to any of the additives in a dry mixer of conventional design, shown in FIGURE 1 by the numeral 10. Suitable mixing apparatus, such as a blade propeller, not shown, or the like, which is of conventional design, may be operated within the mixer 10. The dry mixer empties into a lower tank 12, which is designed to formulate and mix the dry materials from the dry mixer into a paste. Again, suitable mixing means, not shown, is contained within the tank 12. Inlet 14 is suitably disposed on the upper portion of the tank 12, to permit the addition of a liquid binder to the ore concentrate-additives mixture. The purpose of the binder is merely to maintain a desired shape of the log, once it is formed. It is not necessary to use any particular binder, and almost any one will serve the purpose. However, it has been found that binders such as bentonite or thick molasses are useful. Of particular utility is the waste molasses, since it is a ready source of cheap carbon, which may be desirable under certain circumstances. The use and presence of an excess of water has not been found to be desirable in the making of the paste from which the log will be formed, because the presence of too much moisture in the log produced has been found to produce cracking of the log prior to melting in the furnace. It is desirable that the log attain sufficient hardness by the time it reaches the furnace, in order that it present a solid front to the melt off action of the flame.

The thick paste, after being mixed for a sufficient time within the mixing tank, is permitted to drop from the mouth 16 of the mixing tank in the form of a gob 18. The gob which is maintained within a predetermined volume range by a cutoff plate 20, that may be simply operated as by solenoid 21, falls into the compacting tube 22. Disposed on the tube 22 adjacent the entrance of the gob into the tube 22 is a spray nozzle 23, which operates following the cutoff plate to spray a lubricant such as liquid petrolatum or the like on the outside of the gob and on the interior surface of the tube. Operatively disposed within the tube 22 is a reciprocating ram 24, which forces the log forward. The ram is motivated and controlled by means 26, shown schematically in FIGURE 11, which may be air operated (as shown) or electrically controlled. As the gob falls into the compacting tube 22, and after the lubricant is sprayed, the ram 24 forces the material towards the narrowing end of the tube and into a firm and relatively hard mass, from which it enters the extrusion chamber 28, to form the finished log L.

As shown in FIGURE 1, the log L is received on a suitable conveyor system, such as indicated at C for movement towards the furnace F. In FIGURE 1, another mixing and extruding apparatus similar to the one just described, is located to produce another log L, for movement by a similar conveyor C towards the furnace F. FIGURE 2 shows in phantom lines two more converging logs produced in similar apparatus. As a matter of fact, any number of mixing tanks and extruders that produce a number of logs L can be utilized in the practice of this invention. It is also possible that one oversized mixing unit may be employed in lieu of separate mixing tanks, to produce the various number of gobs which are to be made into individual lines of logs.

While the continuous log L is preferred under most circumstances, it is also possible to produce precast logs with self-locking ends. A log according to this embodiment of the present invention is shown in FIGURE 10, by the designation L'. The precast log or loglet L' is cast with male and female ends 30 and 32, respectively. As can be readily understood, the male end of one loglet is designed to fit into the female end of the preceding loglet, in order that a continuous line of the loglets is achieved. Similar conveying apparatus, such as that shown at C in FIGURE 1, would be used to effect the movement of the loglets to the furnace.

The advantage of utilizing the precast log or loglet is that by casting, the loglet may be composed of additional substances which should not be homogeneously mixed with the ore. For example, caustic soda, which is known as a superior desulphuriser, could be cast in the loglet. Under present practice, the caustic soda is not used to any great extent because of its inherent characteristic danger to workmen and their clothing. However, this danger can be avoided by casting the caustic soda within a surrounding matrix of the iron ore, as shown in FIGURES 10a and 10b, wherein the center 34 is caustic soda. The shape of the center 34 of caustic is shown as being in the form of a Christmas tree. However, it need not take that particular shape, although it is preferable to utilize a good distribution of the caustic throughout the log in order to properly desulphurise the iron ore in the molten state.

The conveyor C, while being conventional in all respects, is operated by a motor 36, which may be speeded up or slowed down, according to the need for a faster or slower rate of feeding of the log into the furnace.

The furnace F comprises two principal elements, one, the dome 38, having a bell-shape, and secondly, the trunk 40. The dome is stationary, and maintained in a fixed position by any suitable means such as the tubular overhead support 41. The trunk, however, is vertically movable, and surrounds the dome, as best shown in FIGURE 3. The trunk is supported on weight responsive jacks J, which may be hydraulic, as shown, spring actuated, or otherwise suitably responsive to the weight of the molten iron and slag within the trunk portion of the furnace.

According to the present invention, the jacks J will permit the trunk 40 to lower under the weight of the melt. The lowering of the trunk is a feature that has certain advantages which are important to this invention. For example, as the trunk lowers, the interference plate I, suitably secured to the trunk, as at the base, as shown in FIGURE 3, will interrupt the light ray from a conventional photo-electric circuit P, in order to set in operation and control various features of the present invention. The interference plate is designed to be of such size that the circuit P will be interrupted when the trunk is within its lowest limit of travel, indicating that the trunk is filled with melt.

The trunk is suitably slotted at 42, to slidably accommodate each of the log feeding lines. As shown in FIGURES 1 and 3, each log feeding line is partially enclosed within a tunnel 44, which is affixed to the dome 38. This tunnel is primarily designed to preheat the logs before they enter the furnace, and also to dry the log sufficiently of any moisture that it may contain. Each tunnel is provided within an outlet 45, which conserves for further use, much of the heat of the gases in the form of their specific heat as well as the heat of combustion of any of the combustible gases. A pressure sensitive valve is positioned within the outlet to maintain the pressure within the furnace slightly superatmospheric. The dome is suitably apertured as at 46, to receive each of the log lines. In order to conserve the heat within the furnace, the aperture 46 is usually considerably smaller than the tunnel 44, as shown in FIGURE 3. The logs L are supported towards the center of the furnace by ledges 48, attached to the inner periphery of the dome 38.

The dome is further provided with an elongated slag outlet slot 50, as best shown in FIGURES 5 and 6. A continuous slot is preferred; however, a discontinuous slot may be utilized. The trunk 40 has a corresponding outlet slot 52 in its periphery, which is coextensive with the slot 50 in the dome. The trunk slot 52 is designed to permit the removal of the slag created in the furnace, and is surrounded by a lip 54, which is designed to carry any slag G that is to be removed, out away from the body of the trunk. As best shown in FIGURE 5, the edge of the lip is closed by a slag door D comprising a sliding door 56. The slag door is shaped similar to the contour of the lip 54, as well as the trunk slag outlet slot 52. Therefore, according to the embodiment shown, the slag door is generally curved so as to completely close the slag outlet opening 58 at the end of the lip 54. The slag door is designed to move vertically up over the opening 58, and along the outer edge 60 of the lip 54. The slag door is operated by any suitable means such as the solenoid means 62. The solenoid means is located in any suitable position, but preferably, is positioned above the lip 54, in order to be free from any slag which is passed through the slag opening. In order to facilitate the passage of the slag through the openings 50, 52 and 58, as well as along the lip 54, it is intended that these passageways be lined with a non-wetting material, such as graphite. Positioned below the lip 54 and coextensive therewith, is a cutter 64, which may be operated by any suitable means, such as solenoid means 66. The purpose of the cutter 64 is to sever cleanly the flow of slag billowing through the opening 58. While the cutter 64 is shown to operate linearly, it is also possible that the cutter traverse an arcuate path in window-wiper fashion, and be operated by an electric motor instead of the solenoid 66.

Numeral 68 designates a water quench nozzle, which is aimed towards the lower portion of the lip 54, and is designed to contact the slag flowing out of the opening to cool, and therefore, harden the slag in order to facilitate the severing of the slag by the cutter 64. The water supply is suitably operated through a solenoid valve 70, positioned in a water supply pipe 72.

Cooperating with the slag outlet opening is the flame brush FB positioned substantially diametrically across the furnace F from the slag opening 50 in the dome, and secured around the inner periphery of the dome. A suitable slot, such as at 42, is in the trunk in order to slidably accommodate the flame brush. As best shown in FIGURES 4 and 11, the flame brush is a semicircular conduit 73, preferably water cooled, and constructed of copper or high chrome content steel, and has a plurality of jet openings 74, facing the slot 50. The flame brush is suitably operated by a solenoid valve 76, placed within the gas line 78. Preferably the gas line is cooled with a water jacket 80. It has been found desirable to bleed back some of the very high temperature spent furnace gas to the gas line 78, along with a supply of oxygen which, due to the normal heating of the conduit, will produce the necessary flames. Of the combustible gases recirculated from the furnace, carbon monoxide will predominate, which will burn in the presence of oxygen. However, it may be necessary to add a small amount of fuel gas in order to achieve the full combustion desirable. As is well known to the skilled iron maker, the atmosphere within a furnace is important, and must be controlled. Therefore, the amount of oxygen and other gases entering the furnace should be metered to give the proper flame and the atmosphere desirable for the steel to be produced.

It is one of the important features of the present invention that the flame brush has, at all times, a flame present at each of the jet openings 74. In order to accomplish this, it is obviously necessary to maintain a slight flow of gas through the gas line 78 and solenoid 76, and into the jet openings 74. The purpose of these flames is to maintain the orifices or jet openings clear of any slag or melt that may possibly splash up to the flame brush from within the furnace. As an added precaution, the jet openings may be hooded, as at 79, to further protect the openings from slag splashes. Regarding the intensity of the flame brush, it is intended that the flames be of extremely low intensity until the flame brush is designed to operate, at which time the flow of gas through the openings 74 will suddenly increase and a high intensity and high velocity flame will be admitted from each of the openings 74, and be directed towards the slag openings on the opposite side of the furnace. By reason of using the flame brush, the melt and the slag will not be chilled, which would hinder its easy sweeping removal of the slag.

It is to be noted that the trunk slag outlet 52 and the dome slag outlet 50 coincide only when the trunk 40 has dropped to its lower position, as shown in solid lines in FIGURE 3. When the trunk is empty, the slag door D will be at its highest position, as shown in phantom lines in FIGURE 3. As the trunk is filled with the molten metal, the trunk will lower on the jacks J to the point at which the slag outlets 50 and 52 are coincident. At this time the interference plate I will interrupt the photo-circuit P—P, to begin the sequential operation of the slag door, flame brush, snorkel and control of the burner, conveyors and mixers.

*Burner*

The burner, according to the present invention is unique, in that it is particularly designed to not only melt the logs that are conveyed to the flame of the burner, but also to protect the melt from undesirable contamination, due to the atmosphere within the furnace.

Figure 12:
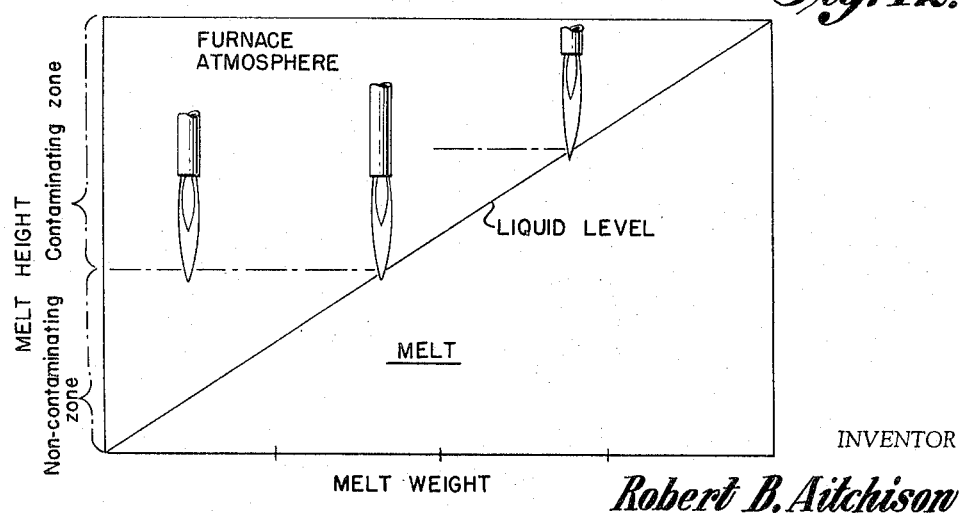
FIGURE 12 is a graphic representation of the relationship between the burner, with its inner and outer envelope of flames to the surface of the melt within the furnace, the representation showing also the non-contaminating zone at a particular melt height and a contaminating zone at other melt heights.

The melt exists within the trunk 40, and is enclosed by means of the dome 38 to provide a confined space within the furnace F. During the course of the operation of the steel producing apparatus, the atmosphere within the furnace will become contaminated with various substances, such as carbon monoxide and oxygen, to name but a few. As is well known, these contaminants can seriously affect the quality of a particular steel which is to be produced in the furnace, and therefore, must be controlled. These contaminants are formed not only from the materials within the log itself, but also are drawn into the furnace from the atmosphere through various leakage points, which would normally exist in the furnace. The contamination danger exists primarily only when the level of the melt within the furnace F or trunk 40 reaches a level whereby the pressure within the furnace increases and the concentration of the contaminant per unit volume is raised. It has been determined that the pressure within the furnace should be maintained at approximately about 2–3 ounces per square inch over atmospheric pressure to prevent unnecessary pressure agitation of the melt and slag. This may be best accomplished by a valve. The contamination zone is shown in FIGURES 3 and 12; however, it is to be understood that the height of the zone of contamination can vary considerably with the furnace, the steel to be made, the log used, the gases burned, and various other factors. As the melt rises within the trunk 40, the flame of the burner, by reason of the high velocity gases emitted, will part the slag existing on the surface of the melt and further expose the melt within the trunk to the contamination in the atmosphere of the furnace. The problem of the burner flame blowing the slag from the surface of the melt is increased by reason of the fact that the slag produced is of a light fluffy type, primarily because this type of slag is easily flame brushed away by means of the flame brush FB. Moreover, because of the contaminating substances inherently within the furnace, it is important to protect the melt-off as it falls from the log towards the melt mass in the trunk.

The novel burner, according to this invention, accomplishes the protection of the log and the surface of the melt, in addition to being capable of quickly melting the logs conveyed to it, by reason of a carefully designed nozzle and controls, which operate the burner.

The burner B, as best shown in FIGURE 3, is composed primarily of a blow pipe barrel or cylindrical enclosure 82, which houses the various conduits 84, 86 and 88 that carry the necessary fluids to produce the desired flame. The barrel 82 is slidably supported within the cylindrical support 41, which is suitably secured to the top of the dome, as by the bolts 92, and thereby maintains the dome 38 stationary. The cylindrical support 41 is immovably fixed by reason of its overhead support 94. The burner is slidable within the cylindrical support 41 and passes through the dome by means of a suitable opening 96 in the upper portion of the dome. Referring primarily to FIGURE 11, the burner is shown to be movable within the stationary dome, by means of the yoke means 98, suitably attached to the top end of the burner, by means of collars 100. The yoke is vertically movable to a desired position, by use of the conventional double acting jack 102, which is designed to raise and lower the burner, as required.

According to the invention, it is preferable that the burner height within the furnace be controllable. The jack 102 is a convenient means for accomplishing this purpose; however, other means may be employed.

A burner nozzle assembly 104, shown in FIGURE 8, is suitably secured as by the threads 106 in the blow pipe barrel 82, to form a continuous surface. The nozzle assembly is preferably a copper casting having a hollow cavity 108 at its base, which is adapted to receive cooling liquid, such as water. The liquid within the nozzle is maintained at a proper pressure by means of the water inlet pipe 110, preferably of copper tubing, which is suitably secured within the copper nozzle assembly, and which carries the cool water directly to the base of the nozzle. The water pipe inlet preferably extends the entire length of the burner, and is shown to emerge from the top of the burner in FIGURE 3, to be connected to a suitable water reservoir. The water is passed out of the blow pipe barrel through water outlet conduit 112, affixed within the top of the blow pipe barrel 82. The water, in order to pass outwardly through the conduit 112, must rise in barrel 82, and therefore, the barrel will be properly cooled, in addition to which the burner fluids which enter the burner through conduits 84, 86 and 88, will be relatively cooled, so that there will be no danger of combustion prior to the desirable time. At the bottom of the burner nozzle assembly 104 are a plurality of water spray nozzles 116, which are fixed within suitable openings in the nozzle assembly. These spray nozzles are utilized to inject steam into the combustion area to scrub the smoke formed during the log melt off. This steam will shortly break down to hydrogen and oxygen, to help maintain a "reducing" atmosphere in the furnace.

The water spray nozzles may be of the screw-in type, having silver brazed at the joints. The number of the spray nozzles which are designed to form jets of cooling water and steam, may be varied according to the purposes of the burner, but as shown in FIGURES 8 and 9, they may be diametrically spaced from one another, and be four in number. The conduits 84, 86 and 88 which carry the process fluids therein are preferably of copper tubing, which are received in the body of the nozzle assembly 104, in suitable openings 118, and secured in place by a suitable connection, such as the rings 120.

It is a significant feature of the present invention that the burner does not pre-mix the process fluids, but rather, maintains them separate until they are about to be ignited. In accordance with this arrangement, separate passageways 122 are provided in spider web arrangement 123, which is integrally formed within nozzle assembly 104, the passageways 122 being in fluid communication with the individual conduits 84, 86 and 88. The passageways 122 each communicates with a suitable mixing chamber 124, which is designed to properly mix the process fluids into a relatively uniform mixture, which is then passed through four passageways, shown at 126, into divergent exit orifices 128. The orifices 128 are shown to be divergent outwardly of the nozzle assembly, which has been found to increase the speed of the mixed gases, as well as to add to the flame stability. Of course, it is to be understood that a greater or fewer number of exit orifices may be used instead of the four which are shown in FIGURES 8 and 9, the number of these orifices depending upon the log melting efficiency desired and the type and quality of steel desired, as well as the production or tonnage of melt per hour required. Additionally, the configuration and number of the exit orifices depends upon the number of logs conveyed to the furnace.

It is an important aspect of the present invention that the burner nozzle emits two distinct flame environments, as best shown in FIGURE 3. The inner flame IF is particularly designed to contact the leading edges of the logs L as they converge towards the center of the burner. The flame, when properly operating, should cleanly melt off the ends of the logs as they are moved towards the flame. The outer environment of flame OF constitutes an envelope which is longer than the inner flame, and this outer flame is designed to provide a non-contaminating envelope for the particles of the log that are melted off and are falling toward the mass of the melt within the trunk 40. As shown in FIGURE 3, the outer envelope of flame just reaches the upper level of the melt, and it is the purpose of this outer flame to provide the protection necessary to the exposed melt at the upper surface by completely covering the exposed area of melt. As can be readily understood, the area of the surface of the melt directly beneath the flame, will not be covered by the usual slag covering as the level of the liquid rises toward the burner, because of the fact that the slag being of a light fluffy nature, will be easily dispersed by the high velocity gases emitted from the burner, which generally have a flame velocity of between 300 to 3000 feet per second. The outer envelope of flame, therefore, is designed to melt and protect the melt from contamination, but such protection is only necessary while the level of the melt is within the contamination zone. The height of this zone, as previously mentioned, is readily determinable, and generally varies to such an extent that no generalization can be made. Broadly speaking, however, it is essential that the outer envelope of flame cover the exposed area of melt when the upper level of the melt is within the contamination zone. This requirement is fulfilled if the burner is maintained at a constant distance from the level of the melt or the flame velocity is reduced. In order to accomplish the former, the burner has associated with the jack 102, an operating means which is designed to maintain a constant distance between the level of the liquid and the bottom of the burner when the melt surface is within the contamination zone. As shown in FIGURES 3 and 11, the means for maintaining this spacing comprises, for example, a horizontal arm 130 affixed to the interference plate I, which moves a resistance panel 132 vertically with the plate I along a contact 133, electrically operating the fluid valve 134, which in turn, operates the piston within the jack 102, in conventional manner to raise or lower the burner B. By reason of this arrangement, the burner will be kept at the required distance from the level of the liquid, and the fact that the slag uncovers the melt to an otherwise contaminating atmosphere, the outer envelope of flame will protect this melt to prevent any such contamination.

FIGURE 12 is a schematic showing of the operation of the burner, wherein it can be seen that the liquid level rises with the melt weight, also decreases the volume of furnace atmosphere remaining, and at a point in this example, approximately 40% of melt capacity, the furnace atmosphere becomes so concentrated in the contaminants that the entire atmosphere above the melt is considered a contaminating zone. When this condition exists, the melt weight will have moved the furnace downwardly to the point where the arm 133 will strike the resistance panel 132 and operate the jack 102 to raise the burner so that the proper distance may be maintained between the burner and the level of the liquid. While the fact that the trunk 40 will lower, due to the weight of the liquid, and thereby create a greater furnace atmosphere above the liquid, the liquid will generally rise faster than the trunk will lower, so that the contaminating zone will come into existence, and there is the necessity for the envelope to cover the exposed melt.

It is preferable that the burner be designed to rise with the level of the liquid, in order that the outer envelope of flame substantially just reaches the level of the liquid, in order to prevent the high velocity of the flame from dispersing the slag so that a great portion of the liquid melt would be exposed, in which case it would not be possible to prevent serious contamination of the liquid. As stated above, it is possible to reduce the flame velocity such that the outer envelope again just covers the exposed area on top of the rising level of melt.

It is recognized that by either raising the burner or reducing the flame velocity, the inner flame envelope will move from its position of maximum efficient melt off, but also as the melt level rises, the free volume in the furnace decreases to tend to offset this apparent loss of efficient melt off by raising the temperature in the furnace.

The fuel to be used may be of conventional type, such as methane, ethylene, propane, butane, natural gas, producer gas, etc. Some of the gaseous fuels that may be utilized in the practice of this invention are set forth on page 71 of the Carnegie Steel Company Publication "Making, Shaping and Treating of Steel." In general, the area just beyond the tip or end of the inner cone of the flame must produce a temperature well in excess of 3000° F., and preferably within a range of 3900° to 4500° F. Not only is this important from the standpoint of speedy melt off of the log, but such high temperature will also melt the silica content in the melt (which was originally in the log). Silica has a melting point of approximately 3000° F. and thus a super high temperature will cause the silica to melt, and become a rather frothy slag, which glasslike material will give protection to the melt. The inner flame also should have a concentrated and low flame mass of high heat value while having a fairly high velocity, generally above 1000 to 3000 feet per second. Of all the gases, it has been found that propane, having approximately a 1950 B.t.u. per pound, is quite satisfactory. The amount of oxygen (90%) generally required for production of a proper flame in the case of natural gas, would be 2 parts oxygen to 1 part natural gas; butane, 6½ parts oxygen to 1 part butane; propane, 4 parts oxygen to 1 part propane, the parts being by weight. Considering the cost and heat value, the oxy-propane mixture is the most suitable. Fuels are not limited to gaseous media. For instance, liquid petroleum fuels may be used in place of gaseous fuels, provided such liquid fuel is thoroughly scrubbed to exclude deleterious substances, such as sulphurous compounds.

Due to the fact that the B.t.u. rating of various fuels is well known, as well as the B.t.u. requirements per ton of tapped steel produced in the open hearth furnace, together with the requirements of the blast furnace for the production of blast furnace iron, it is easily determined how much of the gas should be used to produce a ton of steel. An example of this requirement is given in the above-mentioned Carnegie Steel Company Publication, on pages 203 and 204.

Additives—tube or snorkel

In the roof of the dome 38 is positioned, as best shown in FIGURES 3 and 11, a graphite or other refractory tube 136, which is angled towards the bottom and center of the furnace when both the furnace and the tube are extended. The tube is slidable through a suitable opening in the dome 38, which has a guide or bearing collar 138 for maintaining the proper angular position of the tube, and which permits the tube to slide in and out of the dome, as required. Suitably secured near the upper end of the tube 136, as by lock nuts 140, is power actuated arm 142, operatively connected to a piston within conventional double acting fluid jack 144. The operation of the jack is controlled by solenoid valve 146, which meters the proper amount of fluid from conventional fluid lines. Suitably secured to the upper end of the tube 136 is a plate 148, having an aperture 150, which moves with the tube 136 toward and away from the center of the furnace. Secured to the upper surface of the plate 148 is a ring bearing 152, within which is received for rotation, cartridge cylinder 154. Operable below the plate 148 and closing the aperture 150 is a gate 156, which may be controlled by the solenoid 158. In order to provide rotation for the cartridge cylinder 154, the upper edge of the cylinder is provided with a ring gear 160, operable by means of the worm gearing 162, which in turn is motivated by electric motor 164. The motor and worm gear mechanism are held stationary relative to the cylinder 154 by being mounted on upstanding bracket 166, which is fixed to the plate 148, as shown in FIGURE 3. The upper end of the cylinder 154 is openably closed, except for an opening permitting the entrance of highly compressed air through the means of air pipe 168. As shown, the air pipe is in direct alignment with the tube 136. As shown in FIGURE 7, within the interior of the cylinder 154 is a perforated holder 170, which has formed therein longitudinal bores or cylindrical holes 172, adapted to receive the additives AD in cartridge form.

When the holder 170 is in cartridge ejection readiness, one of the holes 172 is axially aligned with the tube 136, and then due to the air pressure within line 168, the cartridge AD will be ejected into the molten mass in the furnace upon the opening of the gate 156 through actuation of solenoid 158. Rotation of the cylinder 154 by means of the motor 164 will place another cartridge axially aligned with the tube 136, and in ejection readiness. It is to be understood that the scope of this invention is to be considered to include a variation of the above, in which a plurality of cartridges are ejected, either in unison or successively into the melt.

One of the notable features of the present invention is the fact that the tube 136 may eject the cartridge or cartridges, either in a raised or lowered position, depending upon the type of steel and slag desired. In most instances it is desirable to implant the cartridge near the bottom center of the furnace. To do so, the tube 136 is lowered to a point approximately one-third of the melt height from the bottom to fire the cartridge. This distance, of course, may be varied and is not critical. After the implantation, the jack 144 will then raise the tube to the desired height.

The cartridge may contain any of the usual additives that are used in the steel industry to produce the desirable "boil" of the molten metal. Slag producing materials may also be used. Among these materials is aluminum, preferably in small nuggets or pellets, which is a very active deoxidizer as well as slag producers. Included in the same cartridge, or in a separate cartridge, are the metalloids, well known to the steel industry, for producing the type of steel desired. Included in this group are metals such as carbon, nickel, chromium, iron-manganese, and the like. It is preferred that the slag or "boil" producing additives be shot into the molten metal first. Due to the design of the apparatus of the present invention, the cartridge will be angled toward the bottom and center of the furnace, in order that the additives pass through both the slag layer already present, as well as the molten metal. As soon as the slag or "boil" producing additives have been shot into the melt, the slag will cascade up to the surface. At this time, the slag should be removed by means of the slag door D and flame brush FB. A short period later, the metalloids may be shot into the melt when the slag is not being produced in great volumes, or actually has ceased.

As stated, it is possible that one cartridge may be sufficient if it contains all the slag and "boil" producing materials, and the metalloids or separate cartridges may be used. Also, as set out in the description of the preparation of the log, additives may be present in the log itself, which supplement the additives in the cartridge. The effect of precast logs having additives within would seem to reduce the number of cartridges needed, as well as change the composition of the cartridges to the extent that only the required total amount of the additive is present in the melt.

At a suitable time during the working of the molten metal in the furnace, but preferably during the quiet period of the molten metal, that is, after the material has been worked sufficiently, a kneading action of the melt by the use of electromagnetic waves has been found desirable. To accomplish this, an electromagnetic stirrer or agitator MS is shown schematically in FIGURES 3 and 11. The type of stirrer is of conventional design, such as are generally known to be available for electric induction furnaces.

Operation

The operation of the present invention in general is undoubtedly quite clear, in view of the detailed description above; however, the sequential operation of the various elements of the present invention is an important aspect of the invention, and briefly may be described as follows.

The pulverized concentrated ore, including any additives that are to be made an intergral part of the log, are poured into the dry mixer 10. The suitable mixing equipment within this container produces the necessary uniformity, and the material issuing from this mixer is deposited into the tank 12, into which the binder, such as molasses and the like, is poured through inlet 14 to produce a uniform extrudable mixture. Conventional agitation and stirring are also provided in the tank 12 to assure the necessary uniformity. Gobs 18 are permitted to be formed at the mouth of the mixer 16, and are severed by means of a suitably operating cutoff plate 20. The gobs are lubricated by a spray of lubricating material, such as liquid petrolatum introduced at 23 into the compacting tube 22, for the purpose of reducing the friction and wear on the moving parts. The ram 24 is reciprocally operated through the fluid motor 26 to force the gob into and through the extruding chamber 28, in order to produce the log L. The operation of the ram 24 controls the production of the log L, and is in turn controlled by the solenoid valve 174, which controls the fluid from the hydraulic pump HP. The solenoid valve 174 is operated through the timer TM, which automatically controls the movement of the ram 24. The operation of the gate or cutoff plate 20 is also controlled through the timer, as shown in FIGURE 11, and therefore, as the ram ceases operation, so does the cutoff plate.

The logs L are moved by their respective conveyors C towards the furnace F. The conveyors are operated by the motors 36, which are controlled by the timer TM, such that the conveyor motors, the solenoid 21 for the cutoff plate, and the fluid motor 26 for the ram, cooperate in the production of the log. Therefore, as the conveyor motors 36 are stopped or slowed down, so also the fluid motor 26 and the frequency of operation of the solenoid 21 are slowed down, and when one stops operation, all stop operation.

As the logs enter the furnace F, the burner B will be properly positioned to melt each row of logs within its inner envelope of the flame IF, the outer envelope of flame OF being designed to protect both the log meltoff and the surface of the melt within the furnace F. The burner has a water cooled nozzle assembly, and is of the post mixing type. The burner is raised and lowered by means of the solenoid valve 176, which operates the burner jack 102. The valve 176 is operated in proper sequence through the timer TM, and therefore, as the logs L have been slowed down or stopped, the valve 176 will actuate the jack 102 to raise the burner out of position. Suitable valve controls, as shown, can be used to vary the composition of the flame by controlling the individual fluids making up the burning mixture, as well as the total flow of fluids to vary the flame velocity.

As it is preferable to maintain the bottom of the burner at a substantially constant distance from the level of the melt when the level of the melt is in the contaminating zone, the valve 134 is operated by means of the resistance panel 132. The operation of the snorkel tube S is controlled by the jack 144, the movement of which is controlled by the valve 146, which in turn is connected to the timer TM for proper sequential operation. The cartridge gate solenoid 158 is also operated by the timer TM, the operation of which will provide communication between the aligned cylinder hole 172 and the tube 136. The cartridge cylinder motor 164 has its operation controlled by the timer TM. Regarding the snorkel operation, the tube 136 is lowered into the melt, and when at its lowest position, the solenoid 158 is energized to open the gate and the cartridge is implanted in the melt. If an additional cartridge is to be shot into the melt, the motor 164 will be automatically operated to place an additional cartridge in tube aligned position. However, if only one cartridge is to be shot into the melt, the tube is returned to its normal position by means of the jack 144. The operation of the motor 164 to rotate the cartridge cylinder may operate before, during, or after the operation of the jack 144 in this instance, when only one cartridge is to be implanted into the melt. At a time prior to the shooting of the cartridge into the melt, it is preferable that slag door D will be raised by the solenoid means 62, to provide the necessary slag opening in the furnace for the slag to be blown out by the flame brush FB, operated by the solenoid valve 76, which in turn is connected to the timer for sequential operation after the opening of the slag door. The flame brush should generally be in operation prior to the firing of the cartridge through the tube 136, because slag is normally produced during the melting of the logs, and if the cartridge were to be implanted into the melt without removal of the slag already at the surface of the melt, it is possible that such an excess of slag would occur that its removal would be very difficult.

At a time when the flame brush has removed the undesirable slag, cutter 64 is operated through solenoid 66 to cut off the slag at the outer edge of the lip 60. To harden the slag at this outlet, the water quench nozzle 68 is operated through solenoid valve 70. Both the water quench and cutter are sequentially timed to operate after the flame brush has been reduced in velocity. This may take place any time before the tapping takes place.

After the snorkel S operates to implant the cartridge of metalloids into the melt, the log conveyor motor 36 should be slowed down, and the burner pipe raised with a concurrent decrease in the flame velocity. As the log conveyor slows down, the ram 24 and the cutoff plate 20 stops operation. The tap T is sequentially operated by the timer TM to permit the steel melt to flow outwardly into suitable receptacles.

The entire operation of the various elements of the invention is triggered by the movement of the trunk 40 on the jacks J, due to the fact that as the melt rises in the trunk 40, the trunk will fall until the interference plate I cuts off the light ray in the photocircuit PP. As soon as this plate has intercepted the flow of light, an electrical signal that the trunk is filled with melt and the cartridges should be implanted in the melt, is transmitted to the timer, which in sequence will reduce the burner flame and optionally raise the burner, raise the slag door, operate the flame brush to its maximum, lower the snorkel S into the melt, energize solenoid 158 to open gate 156 to shoot the cartridge into the melt, optionally rotate the cartridge cylinder 154 by means of motor 164, and raise the tube by means of pump 144 and valve 146. The cutoff plate 20, the ram 24, and the conveyors C should, of course, be slowed down and stopped after the burner B is reduced in intensity.

While one embodiment of the means for operating the various elements of the invention has been given, it is to be understood that the means for operating the individual features such as the solenoid valves, fluid pumps, jacks or motors, may be changed, and any similarly operated mechanism such as a group of electronic relays may be used. The importance of the operation is the fact that it is sequential and is automatic, and therefore, permits of a simple yet effective method of making steel by directly reducing iron ore.

I claim:

1. A furnace assembly for the direct reduction of iron ore to steel comprising: an enclosed furnace for melt, means for moving at least one iron concentrate log into the furnace, a burner positioned within said furnace, said burner being adapted to melt said log, weight responsive means cooperating with said furnace to control the movement of the log and the melting of the log.

2. A furnace assembly for the direct reduction of iron ore into steel comprising, a furnace having a stationary dome portion and a movable dome receiving trunk portion, a burner slidably received through the dome portion, conveyor means associated with said furnace assembly moving at least one continuous log into said furnace; openings in said dome and trunk portion forming a slag outlet means, means closing said outlet means forming a slag door, a flame brush positioned within said furnace and disposed across the furnace from said slag door, weight responsive means associated with said trunk portion for selectively controlling the operation of the slag door, flame brush and burner.

3. The furnace assembly of claim 2 wherein the weight responsive means includes fluid jacks supporting said trunk portion.

4. The furnace assembly of claim 2 including a water quench nozzle directed at the outlet means, and a cutter means for cutting the slag from the outlet means.

5. A furnace assembly for the direct reduction of iron ore into steel comprising: a furnace having a stationary dome portion and a movable dome receiving trunk portion, a flame producing burner received through the dome portion, means for producing and means for moving at least one continuous log into said furnace to be melted by the flame of said burner, slag door means positioned at one side of the furnace, a flame brush positioned at the other side of said furnace and adapted to brush slag out the slag door means, tap means positioned at the lower portion of the furnace, weight responsive means associated with said trunk portion, said weight responsive means being operative to automatically open said slag door means, operate said flame brush to sweep slag from the furnace, control the melting of the logs, control the production and movement of the logs and tapping the metal in the furnace.

6. The furnace assembly of claim 5 including a snorkel tube slidably received through the dome portion and operated and controlled by said weight responsive means.

7. A furnace assembly for the direct reduction of iron ore to steel comprising: an enclosed furnace for melting iron ore, including a trunk portion for receiving and holding the melt, said trunk portion being mounted for vertical movement, weight responsive means for detecting predetermined movement of said trunk portion, a flame brush positioned within said furnace, slag door outlet means positioned on said trunk on the side opposite to said flame brush, said weight responsive means operative to start said flame brush and open said slag door for removing slag from said furnace.

8. A furnace assembly for the direct reduction of iron ore to steel comprising: an enclosed furnace for melting iron ore, including a trunk portion for receiving and holding the melt, said trunk portion being mounted for vertical movement, weight responsive means for detecting predetermined movement of said trunk portion, means for implanting additives through the melt and near the bottom of the melt, said weight responsive means operative to control said additive implanting means when melt in said trunk portion attains sufficient weight.

9. A furnace assembly for the direct reduction of iron ore to steel comprising: an enclosed furnace for melting iron ore, including a trunk portion for receiving and holding the melt, said trunk portion being mounted for vertical movement, weight responsive means for detecting predetermined movement of said trunk portion, means for implanting additive through the melt and near the bottom of the melt, said weight responsive means operative to control said additive implanting means when melt in said trunk portion attains sufficient weight, said means for implanting additives including an extensible tube, said tube being sufficiently long to pass through the melt and release additives adjacent the bottom of said trunk portion.

10. A furnace assembly for the direct reduction of iron ore to steel comprising: an enclosed furnace for melting iron ore, including a trunk portion for receiving and holding the melt, said trunk portion being mounted for vertical movement, weight responsive means for detecting predetermined movement of said trunk portion, a flame brush positioned within said furnace, slag door outlet means positioned on said trunk on the side opposite to said flame brush, said weight responsive means operative to start said flame brush and open said slag door for removing slag from said furnace, said means for implanting additives including an extensible tube, said tube being sufficiently long to pass through the melt and release additives adjacent the bottom of said trunk portion.

11. The furnace of claim 1 including a flame brush positioned within said furnace.

12. The furnace of claim 11 including a plurality of jets present in said flame brush positioned around the interior of the furnace, whereby to direct flames to remove slag from said melt.

13. The furnace of claim 1 including a slag outlet means positioned to one side of the furnace and a flame brush positioned in the furnace and disposed across the furnace from said slag outlet means.

14. In the process of making steel through the direct reduction of iron ore forming a melt, the improvement comprising: providing a flame brush having a plurality of individual flames around and adjacent the surface of the melt, directing a plurality of individual flames from said flame brush along the surface of said melt, and moving slag on said melt by said flames in a direction away from said flame brush and out from said furnace.

15. In the process of making steel through the direct reduction of iron ore forming a melt, the improvement comprising: providing a flame brush adjacent the surface of the melt, directing a plurality of individual flames from said flame brush along the surface of said melt, continuously maintaining at least a portion of said individual flames during said process of making steel, moving slag on said melt by said flames in a direction away from said flame brush and out from said furnace.

16. In the process of making steel through the direct reduction of iron ore forming a melt, the improvement comprising: providing a flame brush adjacent the surface of the melt, directing a plurality of individual flames from said flame brush along the surface of said melt, said individual flames being directed substantially parallel to the surface of the melt, moving slag on said melt by said flames in a direction away from said flame brush and out from said furnace.

17. In the process of making steel through the direct reduction of iron ore forming a melt, the improvement comprising: providing a flame brush adjacent the surface of the melt, directing a plurality of individual flames from said flame brush along the surface of said melt, positioning said plurality of said individual flames around the surface of the melt, continuously maintaining at least a portion of said individual flames during said process of making steel, wherein the individual flames are directed substantially parallel to the surface of the melt, moving slag on said melt by said flames in a direction away from said flame brush and out from said furnace.

18. In the process of making steel through the direct reduction of iron ore forming a melt, the improvement comprising: providing a combustible mixture for a flame brush, establishing flames from said combustible mixture to create said flame brush, positioning said flame brush adjacent the surface of the melt, said flame brush being provided primarily for the purpose of removing slag from the surface of the melt by said flames in a direction away from said flame brush and out of said furnace.

References Cited by the Examiner

UNITED STATES PATENTS

| | | | |
|---|---|---|---|
| 724,770 | 4/1903 | Young | 75—51 |
| 1,992,084 | 2/1935 | McGregor | 75—40 |

DAVID L. RECK, *Primary Examiner.*

H. W. TARRING, *Assistant Examiner.*